UNITED STATES PATENT OFFICE.

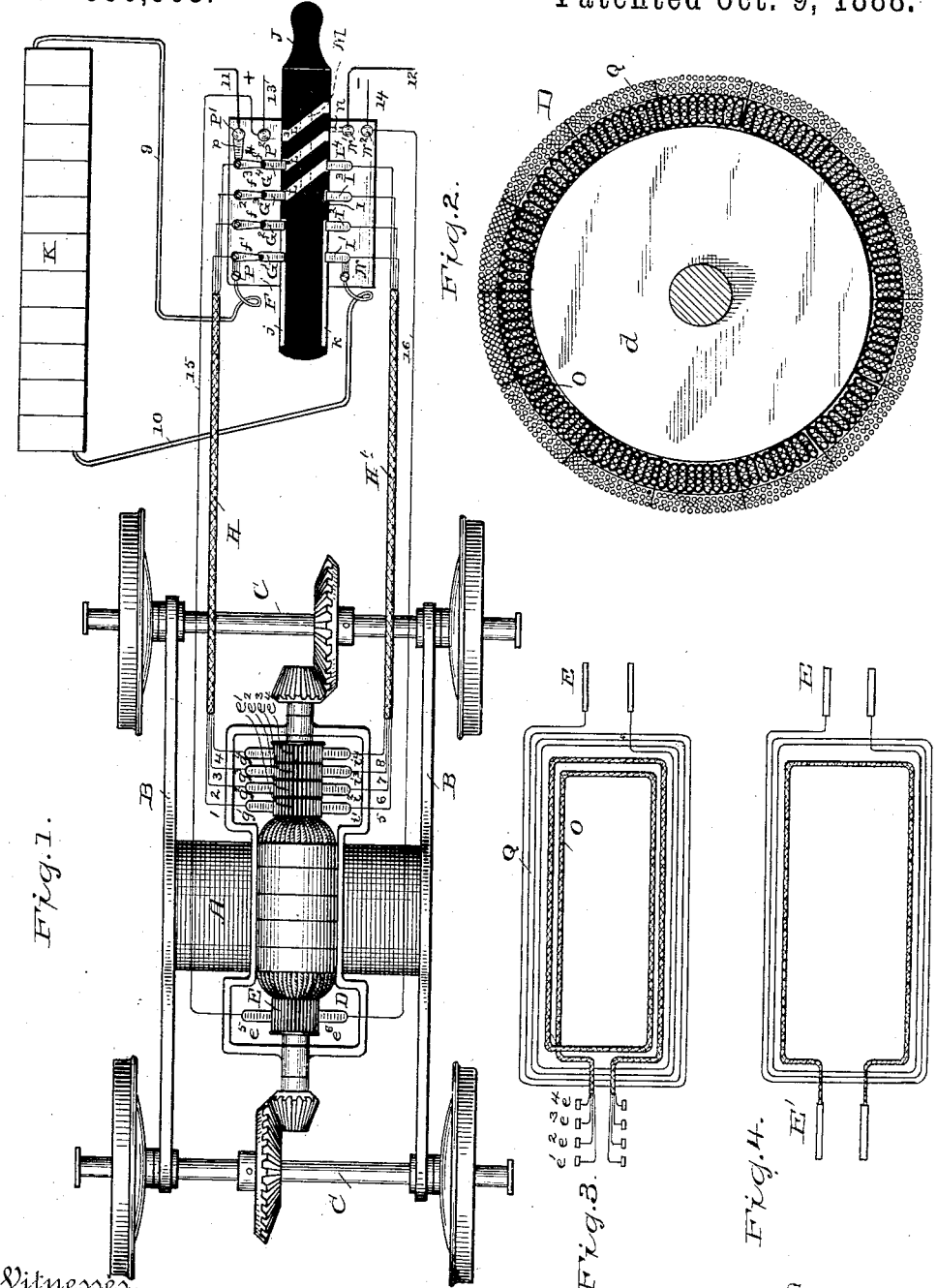

ELIAS E. RIES, OF BALTIMORE, MARYLAND, ASSIGNOR, BY DIRECT AND MESNE ASSIGNMENTS, TO RIES & HENDERSON, OF SAME PLACE.

ELECTRO-DYNAMIC MACHINE

SPECIFICATION forming part of Letters Patent No. 390,905, dated October 9, 1888.

Application filed July 22, 1887. Serial No. 244,976. (No model.)

*To all whom it may concern:*

Be it known that I, ELIAS E. RIES, a citizen of the United States, residing at Baltimore, in the State of Maryland, have invented certain new and useful Improvements in Electro-Dynamic Motor-Generators, (Case B,) of which the following is a description.

My present invention relates to improvements in electro-dynamic machines; and it consists more especially in the electrical construction of the armatures thereof, which, according to my invention, are provided with two distinct sets of coils, one of which is separable into a number of separate coils for the production of desired effects. The machine is adapted for use as a generator, motor, transformer, or as a combined motor and generator, according to the purpose to which the machine is applied, as will hereinafter more fully appear. All the coils are of separately-insulated conductors, one set being continuous, so that all the wire of each section is in series, the other being preferably composed of a number of wires—for example, four—all assembled together in the form of a flat cable, the terminals of wires forming the cable being insulated each from the other by being connected to separate divisions of the commutator, which is cut into four parts for that purpose. The machine is furthermore provided with a commutator at each end—one for direct connection with the line-wires and series winding, and the other divided, as above stated, into as many divisions as there are wires in the cable with which the multiple circuit is wound. When my electro-dynamic machine is used in connection with a railway-vehicle, the series high-tension coils are preferably permanently connected with the source of supply—that is, with the line-wire—and under ordinary conditions will normally receive current up to their full working capacity, their effect upon the total working-power of the machine being calculated to enable it to overcome ordinary loads and all ordinary strains and demands for power without assistance from the remaining coils. The multiple winding is by means of its divided commutator connected with what I call a "grouping-switch," through which the divisible coils can be united in parallel or in series or in any desired sub-combinations. The main-line conductors are connected to the switch, as are also the conductors leading to a storage battery of any desired capacity. Assuming the battery to be charged and the motor-propelled vehicle to meet a grade steeper than could be overcome by the line-current in the series coils alone, then a portion of the stored current is permitted to flow through the multiple coils, which will at that time be connected with respect thereto in a manner to secure the greatest mechanical effect from the available current. The multiple winding should be so proportioned that when all the coils are connected in series it will constitute a circuit of about the same resistance as the series winding alone, so that, if desired, the multiple winding connected in series may be connected with the series wire and all energized by the line-current, from which it will be understood that my improved machine is, by means of its armature winding and the switch above referred to, capable of being operated by the conjoint action of two sources of electricity of different tensions, the failure of either of which would not prevent its operation, and that in case of the total failure of the line-currents both sets of coils might be connected and energized from the battery until it was exhausted. The battery-current also makes the vehicle entirely self-propelling for short distances, so that it can be run on a switch or into a warehouse or a barn by means of the battery-current without requiring the complicated constructions and additional expense necessary to carry the line-conductors into all such places.

Another feature of my invention relates to the capabilities of the armature and its windings, as described. The multiple winding s preferably placed on the interior, with the series on the exterior, the armature being provided with an iron core, and while the series winding is rendered active by the line-current enough power will be developed in the machine, which in this case is acting as a motor, for the purpose of propelling the vehicle on ordinary grades. If desired, however, the compound and series coils will be alternately placed around the armature-core, this method being preferred in the case of ring armatures for convenience in windings and repairs. When running on downgrades or when coming to a stop—in fact, wherever surplus momentum exists—the line-current can be entirely shut off, when the armature of the motor, being operated by the movement of the vehicle, will act as a generator, and when the speed of rotation is sufficient will produce current that will feed into the main line, and so reduce the quantity required to be generated at the central station. In the meantime the action of the exterior set of coils will cause the production of induced currents in the multiple winding, which currents are straightened by means of their respective commutators and by proper conductors led therefrom to the storage-battery.

I may also use the machine for converting a continuous current of comparatively high tension into a continuous current of comparatively low tension, or vice versa. For example, by passing a current of high electro-motive force and comparatively small volume through the series winding the machine will be revolved and will generate a current of lower electro-motive force and large volume in the multiple wire-coils, which current may, by means of the switch hereinafter described, be taken off to one or more secondary working-circuits and utilized for charging a secondary battery or for other purposes. The electro-motive force and quantity of the current in the secondary circuit may be varied at will by changing the relation of the secondary or multiple coils, as hereinafter described.

I do not limit myself to the use of the machine on electric railways, as described for the purpose of illustration, since the construction shown and to be described may be used equally well as a stationary motor, and it may also be used as a continuous-current converter for the purpose of converting continuous currents of high tension but small intensity into currents of low tension and greater intensity, suitable, for example, for running incandescent lamps, motors, &c., on an arc-lighting circuit. By connecting the line with the divided commutator-brushes in parallel or multiple series the machine can be used to convert low into high tension with equal facility.

The invention also involves numerous improvements in construction and arrangement, which will be fully hereinafter set forth, reference being had to the accompanying drawings, in which—

Figure 1 is a plan view of my improved motor as applied to the running-gear of a railway-car, and showing also in diagram the grouping-switch and connections. Fig. 2 is a transverse section showing the windings of the armature. Fig. 3 is a diagrammatic representation of the armature-windings, and Fig. 4 is a diagrammatic view of a modified form thereof.

Similar letters denote like parts throughout.

A is the motor, which is supported upon suitable frames, B B, carried upon the axles C C of a railway-car-truck.

D is the armature, and E is the commutator connected to the single-series winding $e' e^2 e^3 e^4$, showing the divisions into which the commutator for the multiple windings is subdivided.

F is the grouping-switch, which is provided with brushes $G' G^2 G^3 G^4$, connected with the positive commutator-brushes $g' g^2 g^3 g^4$, to which they are connected by conductors 1 2 3 4, which, for convenience, are grouped in a cable, H. A similar and oppositely-placed set of switch-brushes, $I' I^2 I^3 I^4$, are connected by conductors 5 6 7 8 with the negative commutator-brushes $i' i^2 i^3 i^4$, the said conductors being assembled within the cable H'. Between the oppositely-placed switch-brushes moves a sliding switch, J, which is provided at its outer end with parallel contact-strips $j k$, of a length sufficient to include all the brushes on each side of the switch, and thereby to connect the several windings of the cable in multiple arc. To the first one of each series $G' I'$ are electrically connected the binding-posts P N, from which extend conductors 9 10 to a storage battery or group of storage batteries, K. The opposite end of the switch-board is provided with binding-posts P' N', also connected to the multiple winding and connected to conductors 11 12, and the binding-posts $P^2 N^2$, representing the line-wires 13 14, which are seen connected thereto. The binding-post P' is provided with switch $p$, and each one of the positive switch-brushes G', &c., is likewise provided with a manual switch, $f' f^2 f^3 f^4$, by means whereof, in case of accident to any one of the multiple coils or for any other reason, it could be entirely cut out of circuit. Upon the face of the inner end of the switch J are cross-strips $L' L^2 L^3$, extending obliquely thereacross, so that when the positive end of the strip L' is under the brush $G^3$ its negative end will be under the negative brush $I^4$, and so on, according to the position of the sliding switch J. A return-connection in the form of a strip, M, is indicated in dotted lines on the sliding switch J, and extends from near its upper end, and is provided with a terminal, I, located, as shown in the drawings, opposite to the positive switch-brush $G^3$. A spring-brush, $n$, extends from the binding-post N', and is in constant electrical contact with said return-connection, it being in the path of the sliding switch J.

As shown, the first two sections of the commutator $e' e^2$ are connected in parallel by the brushes $G' G^2 I' I^2$ and the parallel contact-strips $j k$, the currents from said divisions of the multiple winding being conveyed to the storage battery during the time that the motor is acting as a generator, the stored current returning through the armature when acting as a motor, suitable switching devices (not shown) being placed in the battery-circuit to regulate and control the process of charging and discharging, as required. The two succeeding divisions of the multiple winding are, as shown, connected in series to the multiple line-connection 11, so that, as before, when the motor is acting as a generator the currents produced will be conveyed into the main line, and when acting as a motor current will be sent from the main line, passing through the said two divisions $e^3 e^4$ in series. By opening the switch $p$ and drawing the slide out until all four sets of brushes rest upon the parallel connections $j$ $k$ all the multiple windings will be placed in parallel both for charging the battery and for receiving current therefrom. The commutator brushes $e^5 e^6$, resting upon the commutator E, to which the series winding is connected, are brought to the switch board and connected with binding-posts $p^1 n^2$ by suitable conductors, 15 16, from where they are connected to line by wires 13 14 in any suitable manner. As shown, the armature D is composed of an interior core, which may consist of plates or laminæ $d$. (Seen in end view, Fig. 2, and further in Fig. 4.) Upon the core is wound the multiple winding, shown in the form of a cable, O, containing four conductors, the terminals of which, as previously explained, are connected to the commutators $e^1 e^2 e^3 e^4$.

For some purposes it is desirable to vary the sizes of the conductors of which the armature-cable is composed, so that each may have a somewhat different resistance from the other. This feature is of great convenience in making combinations to produce particular effects and resistances; but, ordinarily, wires of the same size would answer every purpose, the manner of their grouping being sufficient to produce the desired results. The series winding is shown on the exterior of the armature at Q, being, as shown in Fig. 3, connected to its commutator E. In Fig. 4 is shown a modification of the foregoing, the difference being that the secondary winding, instead of consisting of a number of separate conductors, is in the form of a large low resistance conductor, which is secured to a single commutator, E', thus producing an armature having two circuits of different resistances, the proportions of which remain fixed.

With the construction described it will be understood that when stationary—that is, applied to the driving of machinery instead of propelling a vehicle, or as a continuous-current converter—the machine I have described would, with the addition of a driving pulley and belt, become a very efficient generator—one capable of generating not only divisible currents and currents that could be grouped and united to produce varying effects, but two sets of currents of different characteristics that may be utilized with varying effects with very little if any rearrangement.

Although described specifically for the purpose of this specification, I do not limit myself to the exact details shown or explained, since various modifications of my invention may be made without departing from the spirit or scope thereof.

Having described my invention, what I claim, and desire to secure by Letters Patent, is—

1. An electro-dynamic machine having two separate windings, one consisting of a single wire wound in series and connected to a suitable commutator, the other consisting of a plurality of wires connected to different divisions of a separate commutator, substantially as described.

2. An electro-dynamic machine having two separate windings, one consisting of a single wire wound in series and connected to a suitable commutator, the other consisting of a plurality of wires connected to different divisions of a separate commutator, and a switch for connecting the several wires in series with the said single wire, substantially as described.

3. In an electro-dynamic machine, an armature provided with two separate and independent windings, one set being in fixed relation and permanently connected to a single commutator, the other set being multiple and separately connected to a divided commutator having a separate section for each division of said winding, and a switch for connecting the several wires, all the multiple windings being arranged to produce cumulative electrical effects on said armature when all or a portion thereof are connected, substantially as described.

4. An electro-dynamic motor the armature of which is provided with separate sets of coils all wound upon the core in the same inductive relation thereto, and each set having an independent commutator and set of connections, whereby said sets of coils may be used separately or combined to produce similar inductive effects, substantially as described.

5. An electro-dynamic machine having its armature provided with two separate and independent sets of coils, each set being of different specific resistance, and means for varying the resistance of one set with respect to the other, substantially as described.

6. A combined electro-dynamic motor and generator having separate sets of coils upon its armature, the resistance of one of said set being adjustable with respect to the other and each set being in electrical connection with a separate circuit, substantially as described.

7. In an electro-dynamic machine, an armature provided with two separate and independent sets of windings arranged to produce independent inductive effects, a separate commutator for each winding, and means for varying the resistance of one winding with respect to the other, substantially as described.

8. In an electro-dynamic machine, an armature provided with two separate and independent windings arranged to produce independent inductive effects thereon, one of said windings being composed of separate insulated strands or conductors, and a switch for connecting said insulated conductors in series, parallel, or multiple series, substantially as described.

9. A combined motor and generator having its armature provided with two separate and independent sets of coils of different specific resistance, means, substantially such as described, for varying the resistance of the coils of one set with respect to that of the other, a primary or feeding circuit in connection with the coils of one set, and a secondary or working circuit connecting with the coils of the other set.

10. An electro-dynamic machine having its armature provided with independent primary and secondary windings, arranged to produce independent inductive effects thereon, said secondary windings being in separate sections and arranged to generate a current in one or more local or working circuits when the primary winding is traversed by current from a suitable exterior source of supply, and a switch arranged to connect two or more of said secondary windings in parallel or series, substantially as described.

11. The combination, with an electro-dynamic motor the armature of which is provided with separate independent sets of coils and having a separate commutator for each set or divisible portion thereof, of line conductors permanently connected with one set, a movable switch representing the terminals of the other sets, and a secondary battery provided with connections having terminals located in the path of the switch, whereby said switch is adapted to connect all the said terminals for charging the battery in parallel and for disconnecting more or fewer of said terminals to permit the battery to discharge through the armature in parallel or in series, substantially as described.

12. An electro-dynamic machine or motor-generator provided with single primary and multiple secondary coils or windings, the electrical resistance of the secondary coils when connected in series being approximately equal to that of the primary coils, substantially as described.

13. An electro-dynamic machine provided with two separate and independent armature-windings and separate commutators therefor, a source of electricity normally in connection with one of said armature-windings and with the field-magnet circuit of the machine, whereby the machine is driven as a motor, and a secondary battery in circuit with the other armature-winding, whereby it may be charged by the current generated therein when the machine is doing less than its normal amount of work, the current so stored in the battery being subsequently discharged through the generator-coils to assist the motor, substantially as described.

14. The combination, with an electrically-propelled railway-car or other vehicle, of a combined motor and generator mounted thereon and adapted to propel the same and provided with two separate and independent sets of armature-windings, an electric conductor or conductors extending along the line of way and normally supplying current to one of said windings, a secondary battery on said vehicle adapted to be placed in connection with the other set of windings, and a switch for establishing the connection between the generator-winding and the battery for charging the latter when the vehicle is not requiring the full power developed by the motor-winding, substantially as described.

In testimony whereof I hereto affix my signature in presence of two witnesses.

ELIAS E. RIES.

Witnesses:
FRANKLAND JANNUS,
JNO. T. MADDOX.